(12) United States Patent
Li et al.

(10) Patent No.: US 8,247,464 B2
(45) Date of Patent: Aug. 21, 2012

(54) METHOD OF SELECTIVE FOAMING FOR POROUS POLYMERIC MATERIAL

(75) Inventors: Wei Li, Austin, TX (US); Hai Wang, Sugar Land, TX (US); Vipin Kumar, Seattle, WA (US); Thomas J. Matula, Kirkland, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 13/082,133

(22) Filed: Apr. 7, 2011
(Under 37 CFR 1.47)

(65) Prior Publication Data

US 2012/0091632 A1    Apr. 19, 2012

Related U.S. Application Data

(63) Continuation of application No. 11/863,056, filed on Sep. 27, 2007, now abandoned.

(60) Provisional application No. 60/848,070, filed on Sep. 28, 2006.

(51) Int. Cl.
*C08J 9/00*    (2006.01)
*C08J 9/12*    (2006.01)

(52) U.S. Cl. ........... 521/50.5; 521/61; 521/77; 521/142; 521/146

(58) Field of Classification Search ................ None
See application file for complete search history.

(56) References Cited

U.S. PATENT DOCUMENTS

| | | | |
|---|---|---|---|
| 1,140,548 A | 5/1915 | Vogelsang |
| 3,072,584 A | 1/1963 | Karpovich |
| 3,449,477 A | 6/1969 | Logomasini |
| 3,988,404 A | 10/1976 | Orimo |
| 4,124,529 A | 11/1978 | Jüntgen |
| 4,329,067 A | 5/1982 | Goudy, Jr. |
| 4,695,301 A | 9/1987 | Okajima |
| 4,756,884 A | 7/1988 | Hillman |
| 5,037,619 A | 8/1991 | Alagy |
| 5,164,087 A | 11/1992 | Naoi |
| 5,234,587 A | 8/1993 | Allington |
| 5,411,687 A | 5/1995 | Imeokparia |
| 5,505,892 A | 4/1996 | Domme |
| 6,168,948 B1 | 1/2001 | Anderson |
| 6,270,641 B1 | 8/2001 | Griffiths |
| 6,310,113 B1 | 10/2001 | Reichman |
| 6,368,871 B1 | 4/2002 | Christel |
| 6,383,422 B1 | 5/2002 | Hoffschmidt |
| 6,672,756 B1 | 1/2004 | Barland |
| 6,926,828 B2 | 8/2005 | Shiraishi |
| 2003/0198130 A1 | 10/2003 | Karp |
| 2003/0213733 A1 | 11/2003 | Beckham |
| 2004/0149634 A1 | 8/2004 | Hughes |
| 2004/0178143 A1 | 9/2004 | Rogers |
| 2004/0245172 A1 | 12/2004 | Petersen |
| 2005/0087767 A1 | 4/2005 | Fitzgerald |
| 2008/0102478 A1 | 5/2008 | Li |

FOREIGN PATENT DOCUMENTS

JP    58-150421 A    9/1983

OTHER PUBLICATIONS

Ang, T.H., et al., "Fabrication of 3D Chitosan-Hydroxyapatite Scaffolds Using a Robotic Dispensing System," Materials Science & Engineering C 20(1):35-42, May 2002.
Balik, C.M., "On the Extraction of Diffusion Coefficients From Gravimetric Data for Sorption of Small Molecules by Polymer Thin Films," Macromolecules 29(8):3025-3029, Apr. 1996.
Brannon-Peppas, L., "Polymers in Controlled Drug Delivery," Medical Plastics and Biomaterials 4:34-44, Nov. 1997.
Byon, S.K., and J.R. Youn, "Ultrasonic Processing of Thermoplastic Foam," Polymer Engineering and Science 30(3):147-152, Mid-Feb. 1990.
Chapekar, M.S., "Tissue Engineering: Challenges and Opportunities," Journal of Biomedical Materials Research 53(6):617-620, Jun. 2000.
Das, S., et al., "Freeform Fabrication of Nylon-6 Tissue Engineering Scaffolds," Rapid Prototyping Journal 9(1):43-49, Jan. 2003.
Griffith, L.G., "Emerging Design Principles in Biomaterials and Scaffolds for Tissue Engineering," Annals of the New York Academy of Sciences 961:83-95, Jun. 2002.
Harris, L.D., et al., "Open Pore Biodegradable Matrices Formed with Gas Foaming," Journal of Biomedical Materials Research 42(3):396-402, Dec. 1998.
Klopffer, M.H., and B. Flacconnèche, "Transport Properties of Gases in Polymers: Bibliographic Review," Oil & Gas Science and Technology 56(3):223-244, May-Jun. 2001.
Krause, B., et al., "Open Nanoporous Morphologies From Polymeric Blends by Carbon Dioxide Foaming," Macromolecules 35(5):1738-1745, Feb. 2002.
Landers, R., and R. Mülhaupt, "Desktop Manufacturing of Complex Objects, Prototypes and Biomedical Scaffolds by Means of Computer-Assisted Design Combined With Computer-Guided 3D Plotting of Polymers and Reactive Oligomers," Macromolecular Materials and Engineering 282(1):17-21, Oct. 2000.
Langer, R., and J.P. Vacanti, "Tissue Engineering," Science 260(5110):920-926, May 1993.
Leong, K.F., et al., "Solid Freeform Fabrication of Three-Dimensional Scaffolds for Engineering Replacement Tissues and Organs," Biomaterials 24(13):2363-2378, Jun. 2003.
Lin, J.H., and A.H. Lu, "Role of Pharmacokinetics and Metabolism in Drug Discovery and Development," Pharmacological Reviews 49(4):403-449, Dec. 1997.

(Continued)

*Primary Examiner* — Irina S Zemel
(74) *Attorney, Agent, or Firm* — Christensen O'Connor Johnson Kindness PLLC

(57) ABSTRACT

A selective high intensity ultrasonic foaming technique is described to fabricate porous polymers for biomedical applications. Process variables, including ultrasound power, scanning speed, and gas concentration have an affect on pore size. Pore size can be controlled with the scanning speed of the ultrasound insonation and interconnected porous structures could be obtained using a partially saturated polymers. A gas concentration range of 3-5% by weight creates interconnected open-celled porous structures. The selective high intensity ultrasonic foaming method can be used on biocompatible polymers so as not to introduce any organic solvents. The method has use in cell related biomedical applications such as studying cell growth behaviors by providing a porous environment with varying topological features.

26 Claims, 10 Drawing Sheets

OTHER PUBLICATIONS

Malinarič, S., "Parameter Estimation in Dynamic Plane Source Method," Measurement Science and Technology 15(5):807-813, May 2004.

Mikos, A.G., and J.S. Temenoff, "Formation of Highly Porous Biodegradable Scaffolds for Tissue Engineering," Electronic Journal of Biotechnology 3(2):1-6, Aug. 2000.

Mikos, A.G., et al., "Preparation of Poly(Glycolic Acid) Bonded Fiber Structures for Cell Attachment and Transplantation," Journal of Biomedical Materials Research 27(2):183-189, Feb. 1993.

Mooney, D.J., et al., "Novel Approach to Fabricate Porous Sponges of Poly(D,L-Lactic-co-Glyucolic) Without the Use of Organic Solvents," Biomaterials 17(14):1417-1422, Jul. 1996.

Nam, Y.S., and T.G. Park, "Biodegradable Polymeric Microcellular Foams by Modified Thermally Induced Phase Separation Method," Biomaterials 20(19):1783-1790, Oct. 1999.

"Report of the Workshop on Biomimetics, Tissue Engineering, and Biomaterials," National Institute of Dental Research, Sep. 24-26, 1996, pp. 1-27.

Schwarz, K., and M. Epple, "Hierarchically Structured Polyglycolide—a Biomaterial Mimicking Natural Bone," Macromolecular Rapid Communications 19(12):613-617, Dec. 1998.

Sefton, M.V., "Functional Considerations in Tissue-Engineering Whole Organs," Annals of the New York Academy of Sciences 961:198-200, Jun. 2002.

Steele, B.C.H., and A. Heinzel, "Materials for Fuel-Cell Technologies," Nature 414:345-352, Nov. 2001.

Whang, K., et al., "A Novel Method to Fabricate Bioabsorbable Scaffolds," Polymer 36(4):837-842, Feb. 1995.

Wong, B., et al., "High-Precision Gravimetric Technique for Determining the Solubility and Diffusivity of Gases in Polymers," Journal of Polymer Science: Part B: Polymer Physics 36(12):2025-2032, Sep. 1998.

Yang, P., et al., "Hierarchically Ordered Oxides," Science 282(5397):2244-2246, Dec. 1998.

Youn, J.R., and H. Park, "Bubble Growth in Reaction Injection Molded Parts Foamed by Ultrasonic Excitation," Polymer Engineering and Science 39(3):457-468, Mar. 1999.

METHOD OF SELECTIVE FOAMING FOR POROUS POLYMERIC MATERIAL

CROSS-REFERENCES TO RELATED APPLICATIONS

This application is a continuation of U.S. patent application Ser. No. 11/863,056, filed Sep. 27, 2007, which claims the benefit of Provisional Application No. 60/848,070, filed Sep. 28, 2006, both of which applications are incorporated herein by reference in their entirety.

STATEMENT OF GOVERNMENT LICENSE RIGHTS

This invention was made with Government support under Contract No. 0348767 awarded by the National Science Foundation. The Government has certain rights in the invention.

BACKGROUND

Fabrication processes of porous polymers for tissue engineering scaffolds include fiber bonding, solvent casting, phase separation, and gas foaming combined with particulate leaching. The fiber bonding method uses fibers dispersed in a polymer solution to form a three-dimensional mesh. Solvent casting involves dissolving water-soluble salt in polymer solutions. After evaporation of the solvent, the polymer-salt composite is leached in water to remove the salt particles. Phase separation techniques use emulsification and freeze-drying to create porous structures. Polymer is first dissolved in an organic solvent with distilled water to form an emulsion. The mixture is then cast into a mold and quenched in liquid nitrogen. After the removal of the dispersed water and polymer solvents, a highly porous scaffold can be obtained.

All the above methods require the use of organic solvents, which may never be fully removed even after leaching for several hours. Residual solvents have been a concern for biomedical applications because of their adverse effects on biological cells. In order to eliminate the use of organic solvents in the scaffold-making process, gas foaming combined with particulate leaching was introduced. In the gas foaming process, polymer powder is mixed with salt particles and compression molded into samples of solid discs. The samples are then saturated with $CO_2$ at 800 psi and foamed by releasing the pressure to ambient pressure. The salt particles are subsequently leached out in distilled water. The drawback of this technique is the long leaching time and potential residual salt effect on biological cells.

In addition to the concerns of organic solvents and long leaching periods, all the above methods can only produce porous structures with pores on a single length scale. Not much control is available for creating pores on multiple length scales in the same porous construct. In the particulate leaching approach, the polymer can be mixed with different sized particles to generate pores of different sizes. However, the location of these particles can not be controlled. Solid free form fabrication (SFF) methods, such as selective laser sintering, have the potential to fabricate structures at multiple length scales. However, the resolutions of these methods are not high enough to achieve tissue mimicking architectures. The challenge for fabricating tissue engineering scaffolds with varying morphology at different locations is twofold: 1) it is technically difficult for a single technique to produce porous features on multiple length scales; and 2) the fabrication process should be biocompatible, so as not introduce any harmful substance that could damage the cell's ability to grow and reform tissue.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Biocompatible polymeric materials with well-defined, interconnected porous structures can play an important role in many biomedical applications, such as tissue engineering, controlled drug release, biochemical sensing, micromixing, and three-dimensional cell cultures for drug discovery. For example, in scaffold-based tissue engineering, porous polymeric scaffolds are critically needed for regenerating damaged tissue or organs by providing a biomimetic environment for dissociated cells to grow and reform. At the forefront of the tissue engineering research, scaffolds with varying morphology such as oriented and graded structures are needed for guiding muscle growth, vascularizing thick tissue slabs, and forming bone interfaces with tendon ligaments and cartilages. In drug discovery research, three-dimensional micro scale scaffolds on polymeric chips are useful in order to build tissue-on-a-chip devices for drug toxicity and efficacy tests.

One embodiment is related to a process to produce a porous polymer. A second embodiment is related to a polymeric chip having a localized region of a micro cellular porous foam. The process and polymeric chip have uses in biomedical applications. The process employs high intensity focused ultrasound to foam gas-impregnated polymers. This ultrasound method uses inert gases including carbon dioxide and nitrogen as blowing agents so as not to introduce any organic solvent or other harmful substances. The process is capable of creating interconnected open-celled porous structures with varying topographical features at selected locations. The pore sizes of these structures can vary from tens of micrometers to a few hundred micrometers and are thus well-suited for tissue related biomedical applications. The effects of major process variables, including ultrasound power, scanning speed, and gas concentration affect both the pore size and interconnectivity of the porous structures. The pore size diameter could be controlled with the scanning speed of the ultrasound insonation and interconnected open-celled porous structures could be created using a partial saturation procedure.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
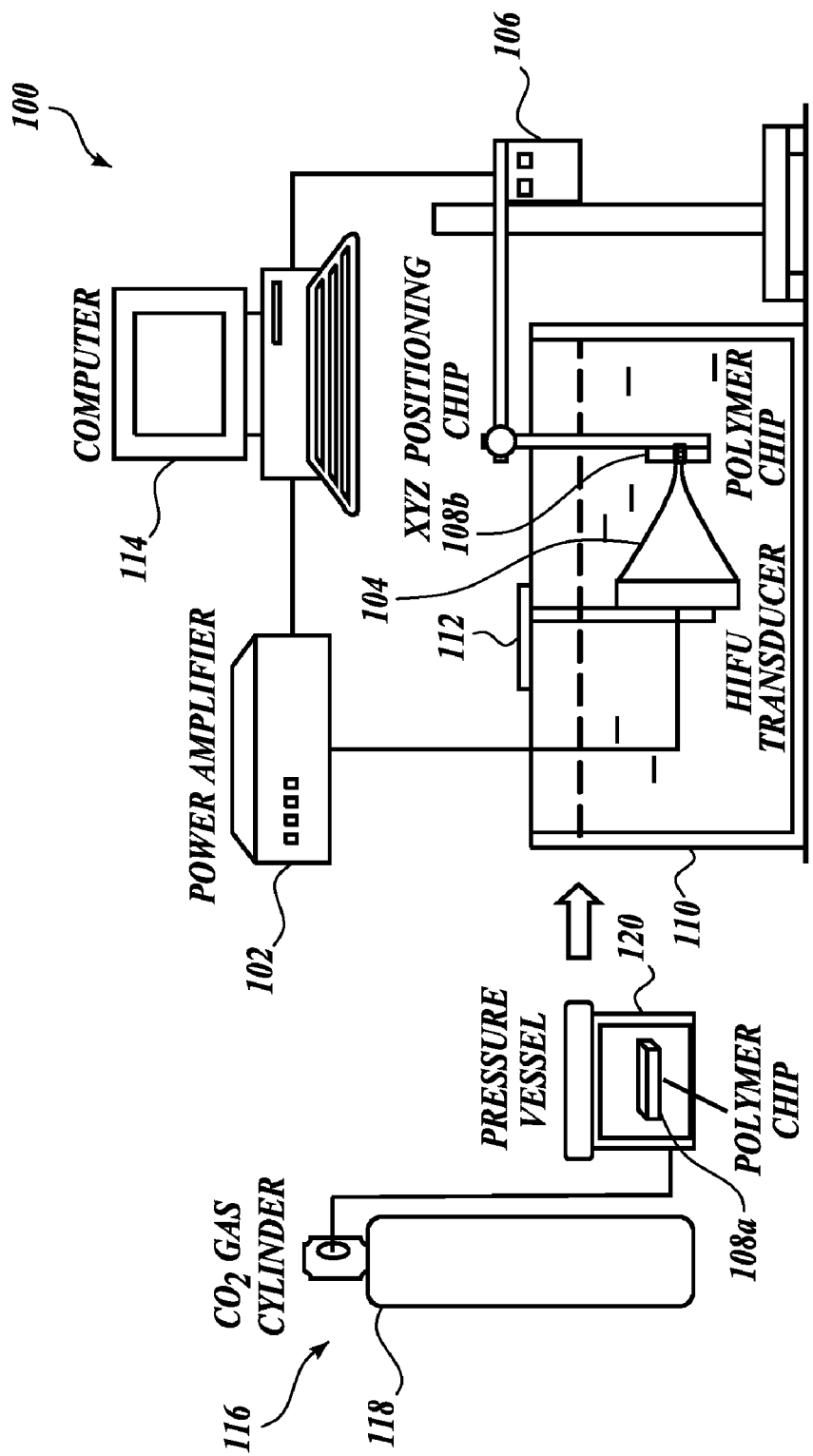
FIG. 1 is a schematic illustration of a system for selectively producing a foam with high intensity ultrasound energy.
Figure 2:
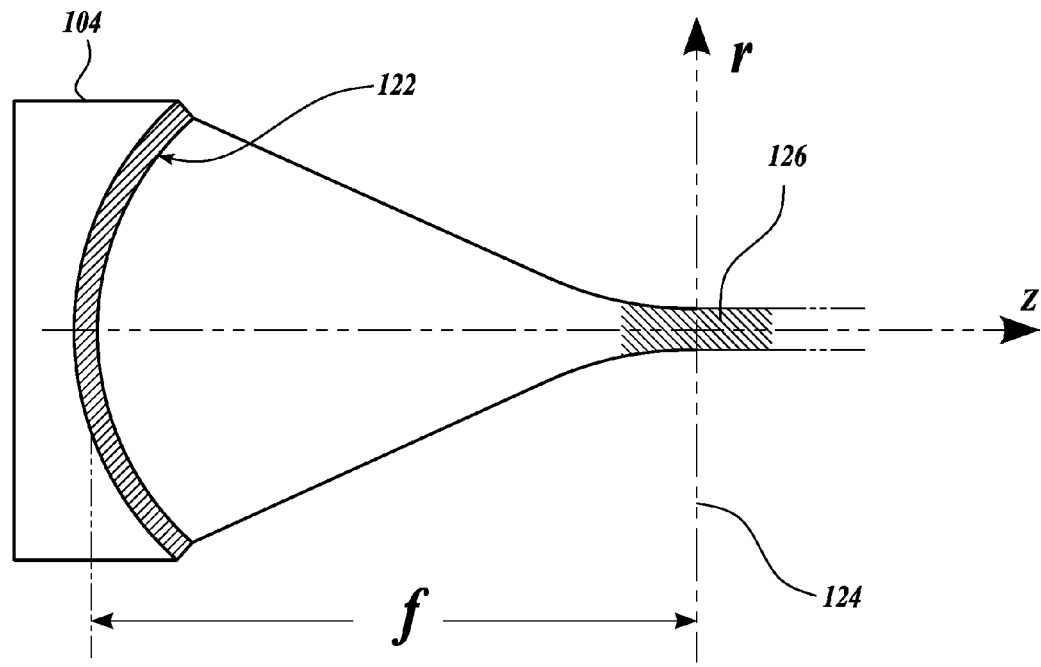
FIG. 2 is a schematic illustration of a focusing ultrasound device.

Illustrated in FIG. 1 is a high intensity focused ultrasound (HIFU) system 100 in accordance with one embodiment of the invention. The system 100 includes a high intensity focusing ultrasound transducer 104 connected to a power amplifier 102. Referring to FIG. 2, a schematic close-up illustration of the high intensity focusing ultrasound transducer 104 is illustrated. The high intensity focusing ultrasound transducer 104 includes a focusing substrate 122 having a concave surface that focuses ultrasound energy into a concentrated focal zone 126. The focal length of the high intensity focusing ultrasound transducer 104 is denoted by "f." The focal plane is denoted by "r." Preferably, when a polymeric chip is insonated with ultrasound energy, the polymeric chip is located anywhere in the focal zone 126. The high intensity focusing ultrasound transducer 104 produces high intensity ultrasound waves or energy that can be focused so that the focal plane can be targeted on a translation stage of a positioning system 106. The positioning system 106 includes means to move the translation stage in three directions. Those directions being the x and y direction in the focal plane and in the z direction forwards and rearwards of the focal plane. A gas impregnated polymeric chip 108b is placed at or on the translation stage at or near to the focal plane of the transducer 104. The polymeric chip 108b is in the target area of the high intensity focusing ultrasound transducer 104. As can be appreciated, the polymeric chip 108b can be moved in the x, y, and z directions so that any location on the polymeric chip 108b can be exposed to the ultrasound energy produced by the high intensity focusing ultrasound transducer 104. The high intensity focused ultrasound energy can be focused on the surface of the polymeric chip 108b or internally in the polymeric chip 108b and at any thickness within the chip. The high intensity focusing ultrasound transducer 104 and the polymeric chip 108b are located in a tank 110 of distilled water for ultrasound wave propagation. The high intensity focusing ultrasound transducer 104 is stabilized by a support arm 112 connected to the high intensity focusing ultrasound transducer 104. The power amplifier 102 is connected to, and thereby, controlled by a computer 114. Computer 114 may be any one of a variety of devices including, but not limited to, personal computing devices, server-based computing devices, mini and mainframe computers, laptops, or other electronic devices having a type of memory. The computer 114 may include a processor, memory, computer-readable medium drive (e.g., disk drive, a hard drive, CD-ROM/DVD-ROM, etc.) that are all communicatively connected to each other by a communication bus. The computer 114 may also include a display and one or more user input devices, such as a mouse, keyboard, etc. Applications for running the system 100 may be stored in memory in the computer 114. Applications may be described in the context of computer-executable instructions, such as program modules being executed by the computer 114. Such applications may be used to control the amount of power from the power amplifier 102 passed to the high intensity focusing ultrasound transducer 104, and also to control the position of the polymeric chip 108b in relation to the focal plane or focal point of the high intensity focusing ultrasound transducer 104 by controlling the movement of the positioning system 106. To this end, the computer 114 is also connected to, and thereby communicates with, the positioning system 106. The computer 114 can issue commands to the positioning system 106 that permit the polymeric chip 108b to be moved in any direction in the xy plane and at any speed. Additionally, the computer 114 can issue commands to the positioning system 106 to move the polymeric chip 108b in the z direction so as to move the polymeric chip 108b to be within the focal plane or forward or rearward of the focal plane of the high intensity focusing ultrasound transducer 104.

A gas-saturation system 116 includes a gas cylinder 118 connected to a pressure vessel 120. The pressure vessel 120 receives gas and can include pressure regulating means to control the gas pressure within the interior of the pressure vessel 120. The pressure vessel 120 may also include timing means to keep track of the time at a given pressure. The pressure vessel 120 can be used to hold a polymeric chip 108a for a given time and at a given pressure. The gas-saturation system 116 is used to impregnate the polymeric chip 108a with the gas. In one embodiment, the pressure used to impregnate polymeric chip 108a may be in the range of 2 MPa to 10 MPa at room temperature. Additionally, the pressure vessel 120 may be opened to the atmosphere in order to allow gas to desorb from the polymeric chip 108a. Once the polymeric chip 108a has been impregnated with gas from gas cylinder 118, the polymeric chip 108a may be fully saturated with gas or partially saturated with gas. The polymeric chip 108a may additionally undergo desorption of gas for a given period of time at atmospheric pressure. This allows for a quicker method of achieving a desired gas concentration for partial saturation of the polymeric chip 108a. For example, the polymeric chip 108a may be impregnated with gas to full saturation at a high pressure. Thereafter, the pressure vessel 120 may be opened to atmosphere to allow the polymeric chip 108a to desorb gas to bring the saturation level to less than full saturation. This achieves a quicker low gas concentration level in the polymeric chip 108a as compared to initially impregnating the polymeric chip 108a with gas at a lower pressure. From the pressure vessel 120, the polymeric chip 108a is transferred to the arm of the positioning system 106 and may be insonated with high intensity focused ultrasound energy to create a localized porous foam within the polymeric chip 108b. One or more areas of the polymeric chip 108b may be insonated with high intensity focused ultrasound energy to create one or more localized and separated areas of foam, or porous regions. The porous regions are formed from and are the same material as the polymeric chip 108b and can be interior to or on the surface of the polymeric chip 108b.

Furthermore, one or more porous regions can be arranged on the chip in any configuration desirable by controlling the positioning system 106. This allows the creation of porous regions that can be separated and distinct from each other within the same polymeric chip 108b. This is possible because of the polymeric chip 108b being mounted to the translation stage of the positioning system 106, and further, the computer 114 can control the start and stop of insonation of high intensity ultrasound energy to permit selective foaming in any desired location on the polymeric chip 108b. It is further possible to control one or more variables that influence the pore size diameter of the pores in the porous regions of foam and also to control whether the pores are interconnected open-celled pores or close-celled pores. These variables include but are not limited to controlling the gas pressure in the pressure vessel 120, controlling the time that the polymeric chip 108a is exposed to gas under pressure, controlling the time that the polymeric chip 108a is allowed to desorb gas after gas impregnation, controlling the power of the high intensity focused ultrasound transducer 104, controlling the speed that the polymeric chip 108b is moved with respect to the focused beam of ultrasound energy, and controlling the distance of the polymeric chip 108 with respect to the focal plane or focal point. For producing interconnected open-celled pores, the method includes providing a polymeric chip having a gas concentration of 3-5% by weight. This concentration may be obtained by removing the polymeric chip 108a from the pressure vessel 120 before equilibrium is reached. Or alternatively, the polymeric chip 108a may be fully saturated, and then allowed to desorb gas to achieve the desired partial saturation and gas concentration.

A method of making a foam having micro cellular pores in accordance with one embodiment of the invention includes impregnating a polymeric chip 108 with gas, followed by applying high intensity focused ultrasound energy onto the gas-impregnated chip. In the gas impregnation step, the polymeric chip 108a is placed into the high-pressure vessel 120 filled with an inert gas, such as nitrogen or carbon dioxide. Over time, the gas molecules dissolve into the polymeric chip 108a so that the chip 108a becomes gas-impregnated. Depending on the gas pressure and the impregnation time (the time that the chip 108a remains in the pressure vessel 120), the final gas concentration in the impregnated polymeric chip 108a can be controlled. In a subsequent step, the gas-impregnated polymeric chip 108a is retrieved from the pressure vessel and mounted on a computer controlled XYZ stage for ultrasonic insonation with the high intensity focusing ultrasound transducer 104. Because of the heating and implosion effects induced by ultrasound waves or energy, the gas-impregnated polymeric chip 108b becomes thermodynamically unstable and undergoes phase separation to generate a foam microstructure having microcellular pores.

The high intensity focused ultrasound polymer foaming effect happens based on two ultrasound related processes: high intensity focused ultrasound heating and high intensity focused ultrasound cavitation. When the polymeric chip is under ultrasound insonation, part of the acoustic energy will be deposited into (or absorbed by) the polymer matrix during the sound wave propagation. The amount of the acoustic energy dissipation depends on the properties of material and the sound wave such as the attenuation coefficient and the ultrasound frequency, and in turn causes the ultrasound heating effect. Besides the heating effect, high intensity focused ultrasound has a cavitation effect in a viscous fluid. High intensity focused ultrasound cavitation happens during the negative cycle of sound pressure, under the conditions that a) the local acoustic pressure is beyond a certain pressure threshold, and b), the existence of tiny cavities in the medium which serve as cavitation nuclei.

Figure 14:
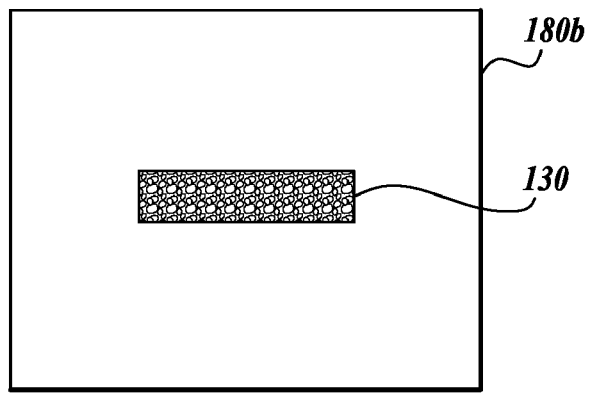
FIG. 14 is a diagrammatical illustration of a polymeric chip having a foam formed from the material of the polymeric chip.

Referring to FIG. 14, a diagrammatical illustration of a polymeric chip 108b with a single localized region of a microcellular porous foam 130 is illustrated. However, the polymeric chip 108b can have any number of porous foam region such as 130. Using the selective foaming method described herein, the localized region of microcellular porous foam 130 can be created in or on any location of the polymeric chip 108b. Regions as small as 1 mm on a side may be produced using the selective high intensity focused ultrasound method described. Furthermore, the polymeric chip 108b and the microcellular porous foam 130 is the same monolithic material so that the foam 130 is formed from the polymeric chip 108b. The foam 130 includes pores having an average diameter of 10 μm to 200 μm, or an average diameter of 80 μm to 200 μm. The average diameter of the pores, D, is calculated from a 2D Scanning Electron Microscopy (SEM) image as $$D = \frac{\sum_{i=1}^{N} \sqrt{4 \times A_i / \pi}}{N}$$

where $A_i$ is the area of $i^{th}$ pore and N is the total number of the pores measured. The polymeric chip 108b is a thermoplastic polymer such as, but not limited to poly(lactic acid), poly(lactic-co-glycolic acid), poly(methyl methacrylate), or polystyrene. These polymers are either biocompatible or biodegradable materials and are useful for many medical or biological applications.

EXAMPLE

Equipment and Materials

Impregnation of polymer samples was conducted in a pressure vessel with a maximum pressure of 7 MPa at room temperature. The gas pressure in the vessel was regulated by a process controller (Model CN8500, Omega Engineering, Inc.) with a resolution of ±0.01 MPa. A precision balance (Model AE240, Mettler-Toledo Inc.) with an accuracy of 10 μg was used to measure the gas concentration in the specimens.

Figure 3:
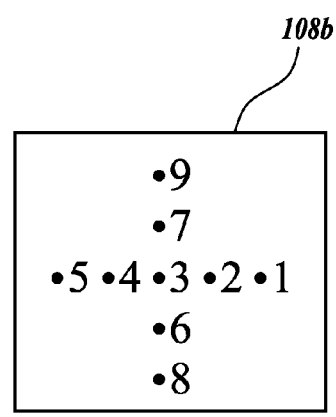
FIG. 3 is a diagrammatical illustration of a polymeric chip with numerals representing temperature-sensing locations.

Referring to FIG. 3, a sample comprising a polymeric chip 108b is illustrated. The polymeric chip 108b includes nine temperature-sensing devices, such as thermocouples. For testing, the thermocouples have been placed in a cruciform arrangement.

The high intensity focused ultrasound (HIFU) system 100 as illustrated in FIG. 1, and also including a data acquisition module was used. The HIFU transducer 104 had a primary frequency of 1.1 MHz and a maximum acoustic power of 200 W (Model H101, Sonic Concepts, Inc.). The focal length denoted by "f" of the transducer was 64 mm. The size of the focal zone 126, defined by the lateral and axial FWHM (full width of half-max intensity), was φ1.26 mm×9.8 mm, as depicted in FIG. 2. The transducer 104 was powered by a linear amplifier (Model AG1021, T&C Power Conversion, Inc.). The sample positioning system 106 was a closed-loop computer numerical control (CNC) stage with an acrylic sample holder. The CNC stage has a positional resolution of 6.3 μm and a programmable travel speed.

Polymeric chips 108 of polymethyl methacrylate (PMMA) (Professional Plastics, Inc.) were acquired in sheets and then cut into 60 mm×40 mm rectangular samples. The thickness of the samples was 1.36 mm. PMMA is not biodegradable; however, it is biocompatible and can be used for cell culture studies for drug discovery, for example. Table 1 below shows the basic thermal and acoustic properties of PMMA. Medical grade $CO_2$ (Airgas Nor Pac, Inc.) was used for gas impregnation of the PMMA samples.

TABLE 1

Material properties of PMMA

| Density $\rho$ (g/cm$^3$) | Sound speed c (m/s) | Attenuation* $\alpha$ (dB/cm) | Thermal diffusivity D (cm$^2$/s) | Thermal conductivity K (W/cm° C.) |
|---|---|---|---|---|
| 1.191 | 2690 | 1.4 | $0.12 \times 10^{-2}$ | $0.198 \times 10^{-2}$ |

*For frequency at 2 MHz

Gas Saturation of the PMMA-$CO_2$ System

Gas impregnation determines the gas concentration in the polymer sample and thus the porous structure to be obtained in the foaming process. The PMMA samples were saturated with $CO_2$ at different pressures to study the effect of saturation on the foam. During saturation, the PMMA samples were removed periodically from the pressure vessel and weighed. The amount of $CO_2$ absorbed in a sample was calculated as the percentage weight increase of the original sample. The saturation pressures used for the gas saturation study were chosen as 2, 3.5, and 5 MPa. The saturation processes were continued until equilibrium gas concentrations were reached.

Temperature Measurements

In order to characterize the heating effect of the ultrasound insonation process, nine T-type thermocouples were embedded in a PMMA sample with a cross pattern, as shown in FIG. 3. The distance between the thermocouples was 5 mm. During the experiment, the axial distance between the sample and the HIFU transducer was first adjusted such that the sample fell inside the focal plane of the HIFU transducer. The sample was then moved laterally to align the HIFU focal point close to one of the thermocouples. Once aligned, the HIFU transducer was turned on for a certain period of time, while the temperature readings from the thermocouples were recorded using the data acquisition system. The thermocouples were calibrated every time before the experiment was performed. The total bias error of the temperature measurement was found to be below 0.6° C.

Parametric Study on the Selective Foaming Process

In the selective foaming process, ultrasound scanning was performed on saturated PMMA samples. There were three major process parameters in this process: the ultrasound scanning speed V, ultrasound output power P, and the gas concentration C of the sample. The ultrasound scanning speed was defined as the velocity of the parallel motion between the polymer sample and the face of the HIFU transducer. The scanning speed is inversely proportional to the ultrasound insonation time, which is a factor in the polymer foaming process. For gas concentration, both fully saturated samples and partially saturated samples were used. The fully saturated samples were obtained by keeping the samples in the pressure vessel until the equilibrium gas concentrations (7.1% and 13.5%) were reached. The partially saturated samples were obtained by retrieving the samples before the equilibrium condition. Partial saturation allowed the samples to have a lower overall gas concentration level (3.26% in this case). Table 2 below summarizes the parameters used in this study.

TABLE 2

Parameters used in the study

| Variables | Values |
|---|---|
| Scanning Speed (in/min) | 3.0, 2.4, 1.8, 1.2, 0.6 |
| Output Power (W) | 6, 8, 10, 15, 20 |
| Gas Concentration (wt %) | 7.1%, 13.5%, 3.26% (Partial) |

Microstructure Characterization

The microstructure characterization of the foamed samples was performed using a scanning electron microscope (Model Sirion XL 30 EDAX EDS, FEI Company). The specimens were freeze-fractured in liquid nitrogen and sputter-coated with Au/Pd. ImageJ® was used to analyze the SEM images. The pores in an image were numbered and their areas measured. The average diameter of the pores, D, is calculated as $$D = \frac{\sum_{i=1}^{N} \sqrt{4 \times A_i / \pi}}{N} \quad (1)$$

where $A_i$ is the area of $i^{th}$ pore and N is the total number of the pores measured. The interconnectivity of the porous structure was verified with a dye penetration test. Blue colored dye was pushed through the porous structure with a needle and syringe.

Results and Discussion

Gas Saturation Behavior

Figure 4:
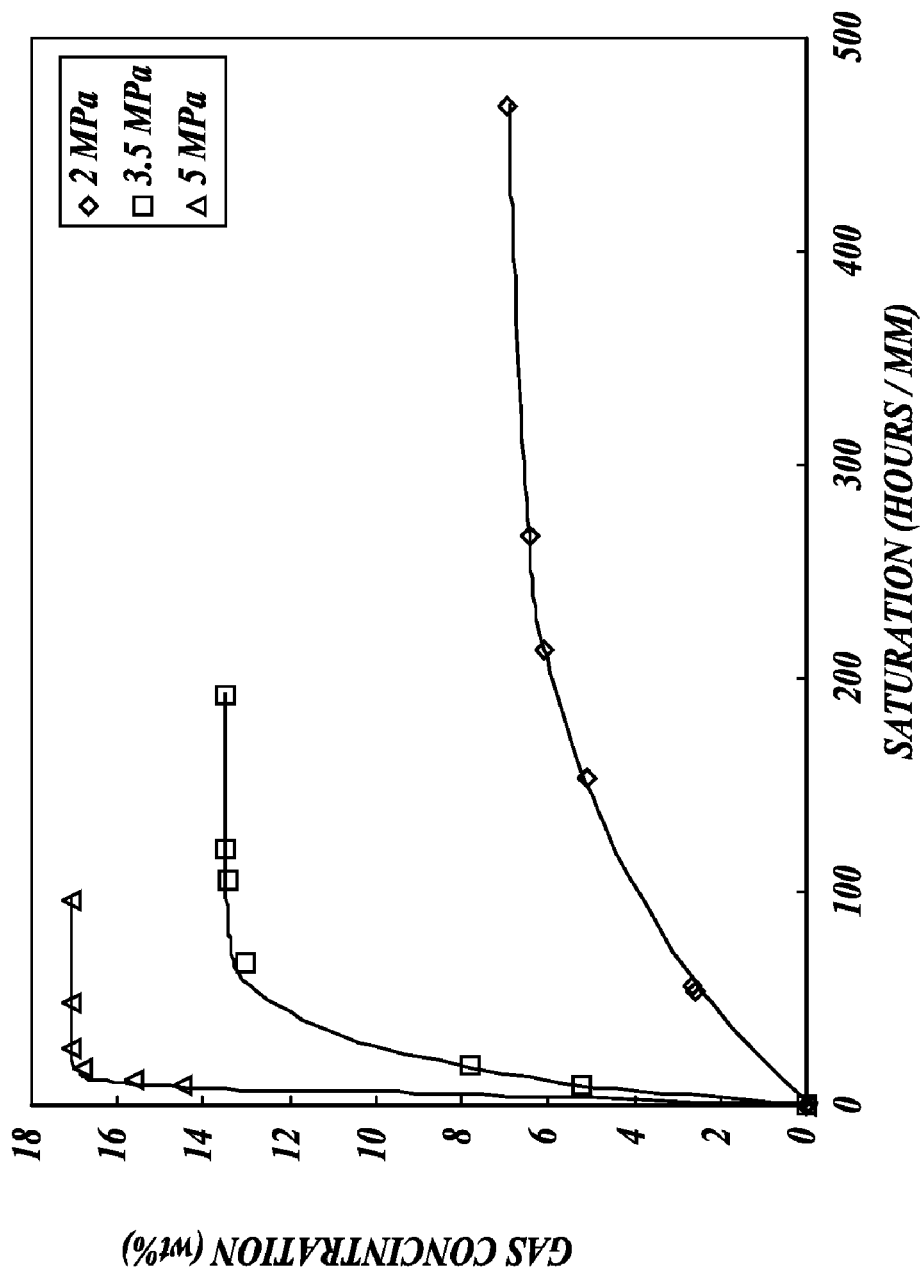
FIG. 4 is a graph representing the saturation in hours per millimeters versus gas concentration as a weight percent at various pressures.

FIG. 4 shows the $CO_2$ saturation behavior of a PMMA sample under 2, 3.5 and 5 MPa saturation pressures. The saturation time is normalized against the thickness of the sample. It is seen from the figure that both the equilibrium gas concentration and the saturation time needed to reach equilibrium depend on the saturation pressure. Gas pressures of 2, 3.5, and 5 MPa resulted in equilibrium gas concentrations of 7.1%, 13.5%, and 17.0%, respectively. For the same sample thickness, the time needed to reach the equilibrium gas concentration at 5 MPa is much shorter than those at 3.5 MPa and 2 MPa. While the equilibrium gas concentration is a function of the saturation pressure, the saturation time behavior in FIG. 4 suggests that the gas diffusivity of the system is a function of gas concentration. The higher the gas concentration is in the polymer matrix, the faster the gas molecules will dissolve in the polymer matrix. Therefore, the gas saturation process of PMMA-$CO_2$ is a concentration dependent diffusion process.

This observation can be used to understand the need for partial saturation of PMMA samples. Normally, if a certain gas concentration level is required for the foaming process, the polymer samples will be fully saturated to achieve the equilibrium condition. However, it will take a long time (days) if a low gas concentration level is required. For example, it takes about 300 hours for a 1 mm thick sample to be fully saturated at 2 MPa, compared to about only 20 hours at 5 MPa. To reduce the saturation time for low gas concentration levels, partial saturation was used in this study. The samples were first saturated at a high gas pressure and taken out of the pressure vessel before fully saturated. They were then set in the atmospheric condition for a certain period of time to allow the gas concentration inside the polymer sample to equalize. This process is termed "desorption," because certain amount of gas will escape from the sample during this time. However, by doing this, low gas concentration levels could be obtained with a shorter overall time. It will be shown that partially saturated samples with low gas concentration levels provide a unique opportunity for creating interconnected porous structures.

HIFU Induced Heating

Figure 5A:
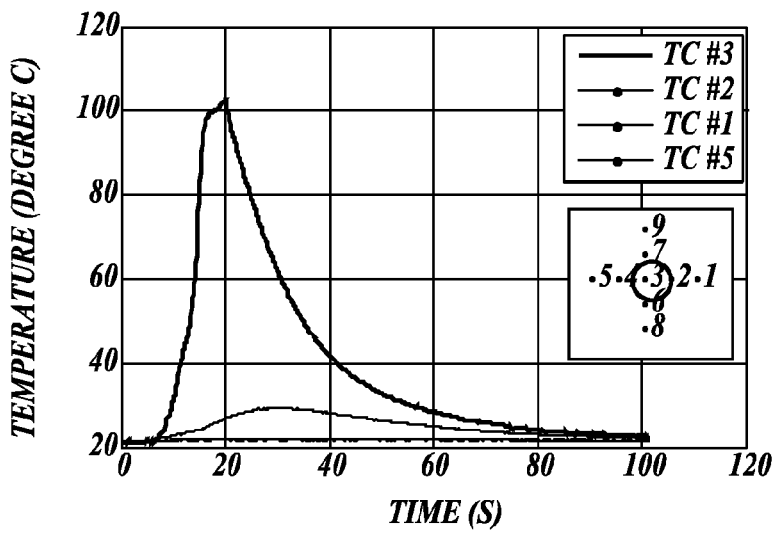
FIGS. 5A-5C are graphs representing the time in seconds versus temperature in degrees Celsius for various temperature-sensing locations.
Figure 5B:
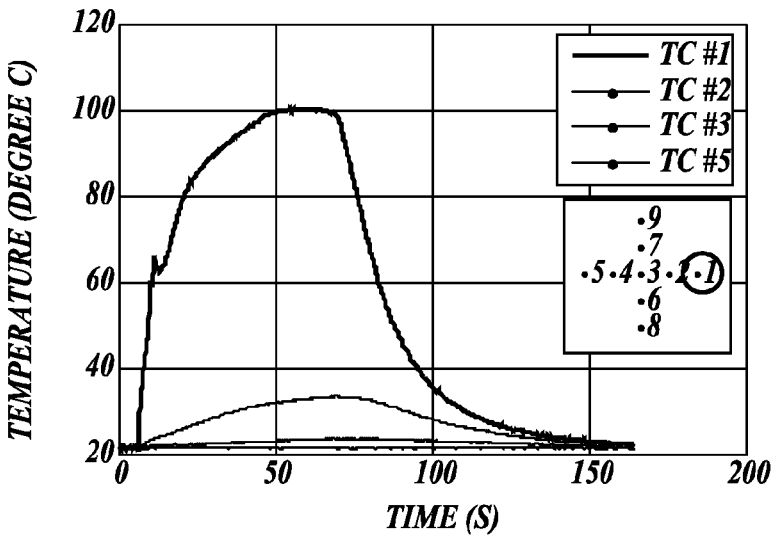
Figure 5C:
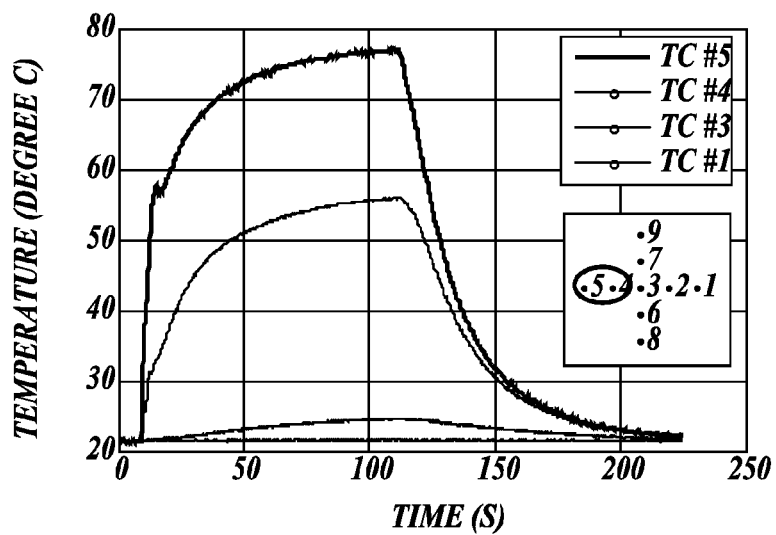
Figure 6A:
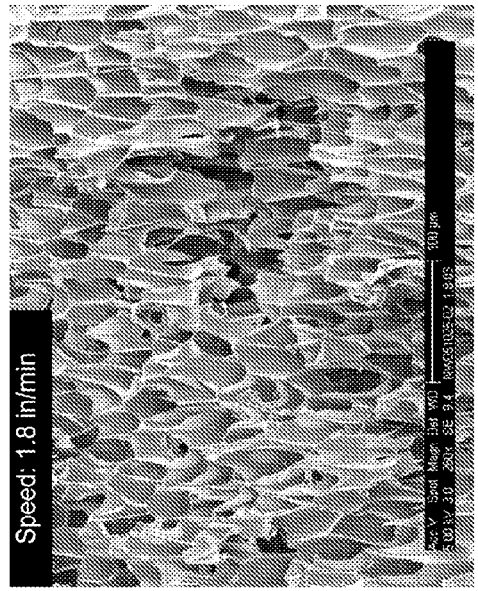
FIGS. 6A-6D are scanning electron micrographs of foams created at various speeds.
Figure 6B:
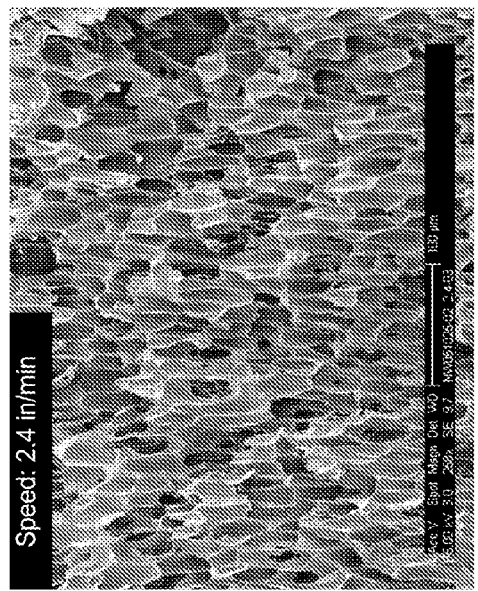
Figure 6C:
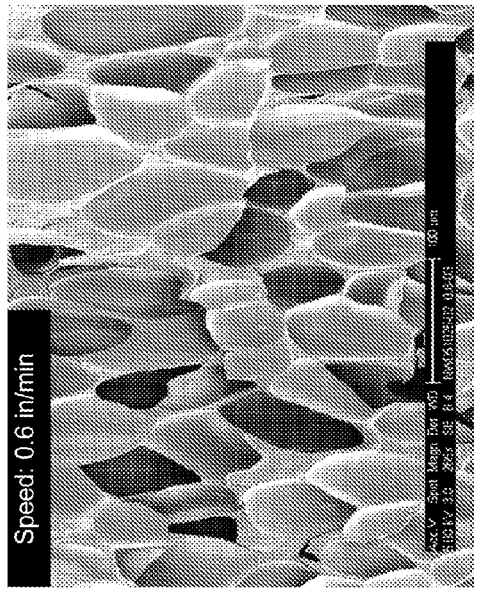
Figure 6D:
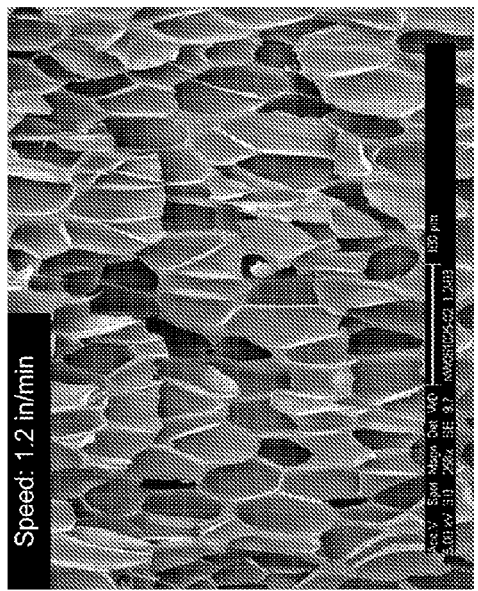
Figure 7A:
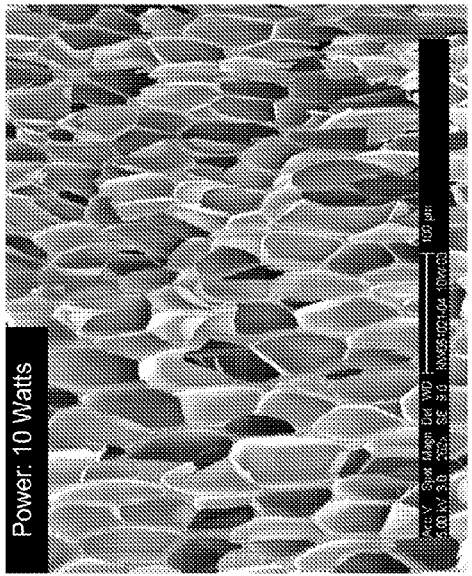
FIGS. 7A-7D are scanning electron micrographs of foams created at various power levels.
Figure 7B:
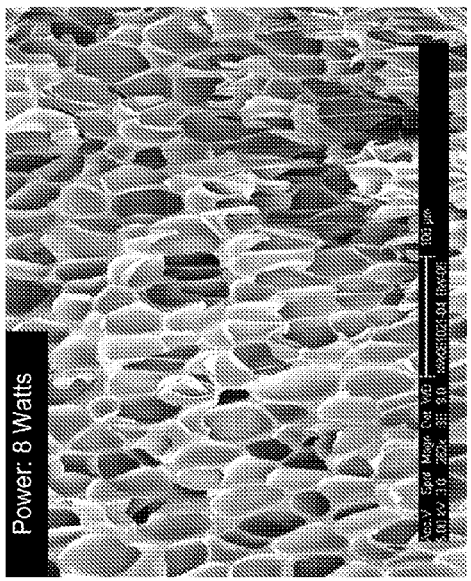
Figure 7C:
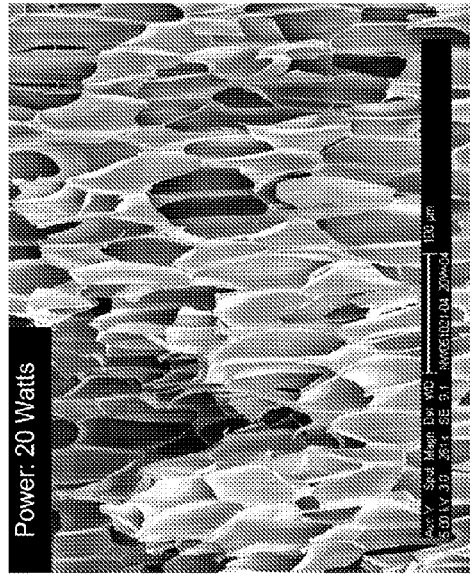
Figure 7D:
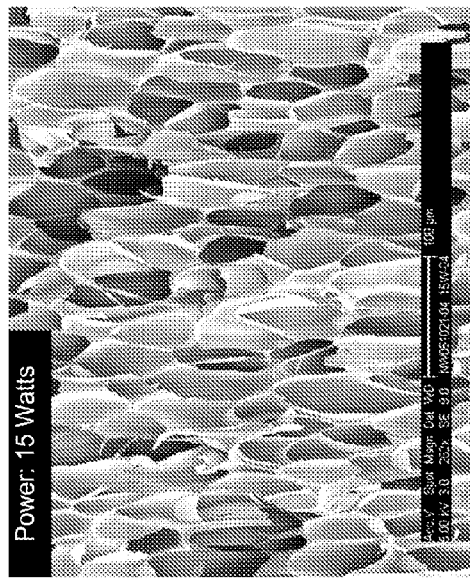

FIG. 5 shows three typical measurements of the HIFU induced heating effects. In FIG. 5A, the HIFU insonation time was 13 s with an ultrasound power of 2 W. The focal point of the sound beam was close to Thermocouple #3. For the case of FIG. 5B, the insonation time was 61 s, the ultrasound power was 1 W, and the focal point was close to Thermocouple #1. FIG. 5C shows the case of 104 s insonation with 1 W ultrasound power, in which the focal point was between Thermocouples #4 and #5. As can be seen from the figures, the thermocouple nearest the focal point of the HIFU beam recorded the highest temperature. For the case shown in FIG. 5A, the maximum temperature exceeded 100° C. after 8 s of HIFU insonation. On the other hand, the rest of the thermocouples either recorded only several degrees of temperature increase or no temperature increase at all. In the case of FIG. 5C, the HIFU insonation spot was closer to Thermocouple #5 than #4. As a result, Thermocouple #5 sensed a much higher temperature increase than Thermocouple #4. In all the cases, the HIFU heating rate was found to be extremely high, on the order of 20° C./s, even under low acoustic power conditions. From these results, it can be seen that the HIFU heating is highly effective and localized. These characteristics can be exploited in the selective foaming process to fabricate porous structures with controllable pore size and at selected locations.

Selective Foaming Results

A PMMA sample was saturated at 3.5 MPa until the equilibrium gas concentration was reached. Foamed regions were created by scanning from left to right with the HIFU transducer at five different scanning speeds. The ultrasound power was fixed at 6 W. The microstructures of the foamed samples were used to study the effects of scanning speed, ultrasound power, and gas concentration.

The Effects of Ultrasound Scanning Speed

FIG. 6 shows the SEM images of four foamed regions on a single PMMA specimen. The ultrasound power was 6 W, and the sample was fully saturated at 2 MPa to obtain a gas concentration level of 7.1%. The scanning speed was varied from 2.4 to 0.6 in/min (i.e., 1 mm/s to 0.25 mm/s). It can be seen that different ultrasound scanning speeds resulted in different pore sizes in the PMMA sample. In the case of V=2.4 in/min (1 mm/s), the average pore diameter was 29 μm, and it increased to 41, 53 and 74 μm when the speed decreased to 1.8, 1.2 and 0.6 in/min (i.e., 0.76 mm/s, 0.5 mm/s, and 0.25 mm/s). Table 3 below summarizes the scanning speed effects at two ultrasound power levels. It can be seen that a lower scanning speed produced a bigger pore size in both the 6 and 10 W ultrasound power conditions.

TABLE 3

Scanning speed effect on pore size (μm)

| Ultrasound power | Scanning speed V [in/min] | | | | |
|---|---|---|---|---|---|
| P [W] | 3.0 | 2.4 | 1.8 | 1.2 | 0.6 |
| 6 | N/A | 29 ± 5 | 41 ± 11 | 53 ± 10 | 74 ± 18 |
| 10 | 25 ± 6 | 42 ± 8 | 52 ± 13 | 73 ± 18 | 99 ± 16 |

*Overall gas concentration 7.1%, pore size data shown as D ± σ, where D is the average pore diameter and σ is the standard deviation.

The Effects of Ultrasound Power

In order to investigate the effects of ultrasound power, the scanning speed of the ultrasound transducer and the sample gas concentration were kept constant. FIG. 7 shows four foamed regions of a PMMA sample. Again, 2 MPa saturation pressure was used to achieve a full saturation of 7.1% gas concentration. The scanning speed was set at 2.4 in/min (1 mm/s). Four ultrasound power levels were used: 8, 10, 15 and 20 W. The SEM images show that the pore size increased from 40 μm to 61 μm with the increased ultrasound power levels. Table 4 below shows the results of the microstructure characterization. Comparison with the results in Table 3 shows that the effect of ultrasound power and scanning speed are not equivalent. When the scanning speed decreased by half, e.g., from 2.4 in/min to 1.2 in/min (i.e., from 1 mm/s to 0.5 mm/s), the pore size almost doubled. However, when the ultrasound power was doubled, the pore size increased by 30%. This indicates that the ultrasound scanning speed has a more significant effect on pore size control.

TABLE 4

Summary of ultrasound power effect on pore size (μm)

| Scanning speed | Ultrasound power P [Watts] | | | |
|---|---|---|---|---|
| V [in/min] | 8 | 10 | 15 | 20 |
| 2.4 | 40 ± 6 | 47 ± 6 | 56 ± 10 | 61 ± 12 |

*Overall gas concentration 7.1%, pore size data shown as D ± σ, where D is the average pore diameter and σ is the standard deviation.

The Effects of Gas Concentration for Fully Saturate Samples

Table 5 below shows the gas concentration effect on the pore size of foamed PMMA samples. Two gas concentration levels were compared in the experiments: 7.1% and 13.5%. These concentration levels were achieved by saturating the specimens until full saturation at 2 MPa and 3.5 MPa, respectively. The ultrasound scanning speed was varied in the experiments while the ultrasound power was fixed at 6 W. As can be seen from the table, the pore sizes in the 7.1% gas concentration specimens were generally larger than those in the 13.5% samples under the same ultrasound parameters. On average the size difference caused by the concentration difference was about 25%, while the gas concentration was almost doubled.

TABLE 5

Gas concentration effect on pore size (μm)

| Equilibrium gas | Scanning speed V [in/min] | | | | |
|---|---|---|---|---|---|
| concentration C [wt %] | 3.0 | 2.4 | 1.8 | 1.2 | 0.6 |
| 7.1% | N/A | 29 ± 5 | 42 ± 8 | 54 ± 10 | 74 ± 18 |
| 13.5% | 19 ± 4 | 26 ± 4 | 31 ± 5 | 44 ± 7 | 59 ± 9 |

*Ultrasound power 6 W, pore size data shown as D ± σ, where D is the average pore diameter and σ is the standard deviation.

The Effects of Gas Concentration for Partially Saturated Samples

It has been shown above that three process parameters (scanning speed, power, and full gas saturation) of the selective ultrasonic foaming process are effective for pore size control, among which the ultrasound scanning speed is the most significant. However, the porous structures created thus far have been mostly closed-celled porous structures. In order to identify the conditions for generating open-celled structures, the PMMA specimens were partially saturated to achieve lower gas concentration levels. In this case, the polymer samples did not reach the equilibrium gas concentration under the pressure used in the saturation stage. Instead, they had non-uniform gas concentration profiles across the thickness of the polymer samples. By manipulating partial saturation parameters, including the saturation pressure, saturation time, and desorption time (defined as the time the saturated samples were set in the atmospheric conditions before foaming), low gas concentration levels could be achieved in a relatively short time.

Figure 8:
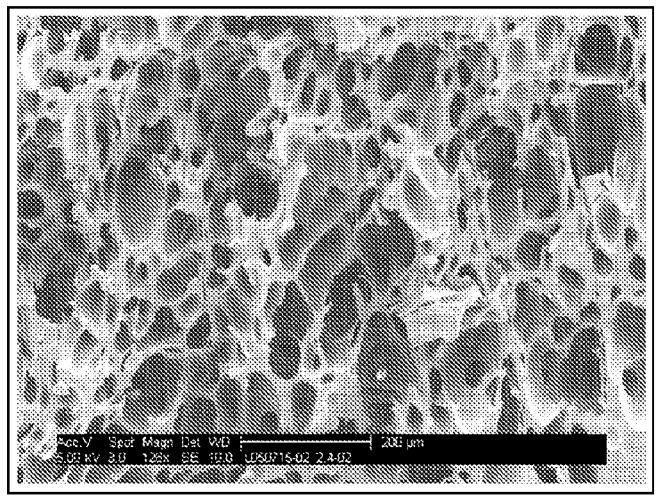
FIG. 8 is a scanning electron micrograph of foam having interconnected open-celled pores.

A large amount of open-celled porous microstructures was observed in partially saturated PMMA specimens. Shown in FIG. 8 is the SEM image of a PMMA specimen. In this case, the PMMA specimen was partially saturated at 2 MPa for 240 hours to achieve an overall gas concentration of 3.26%. The desorption time was 1 hour. The ultrasound power used was 10 W and the scanning speed was 2.4 in/min (1 mm/s). It can be seen from the SEM image that the porous structure is interconnected. The interconnectivity of the porous structure was confirmed using the dye penetration test. It was observed that the dye passed through the foamed region smoothly.

Figure 9A:
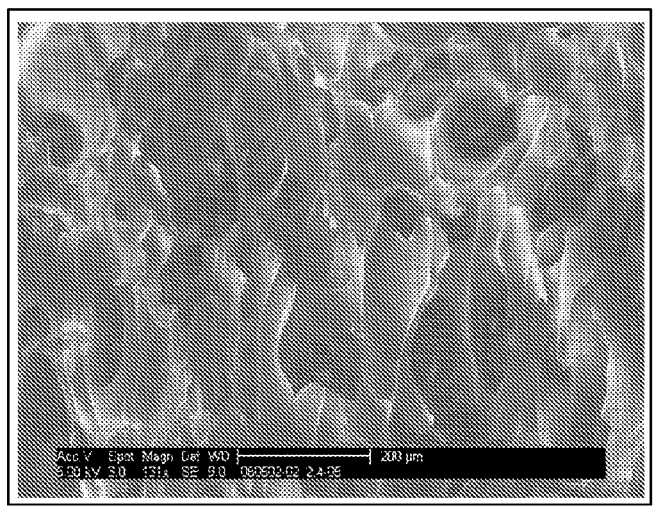
FIGS. 9A-9B are scanning electron micrographs of foams having interconnected open-celled pores.
Figure 9B:
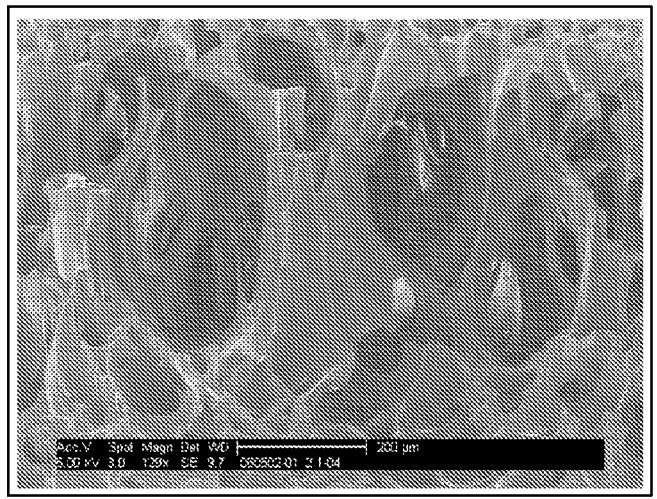

The effects of ultrasound scanning speed were studied on creating open-celled porous structures with partially saturated PMMA samples. The scanning speed was varied from 2.4 in/min to 1.2 in/min (1 mm/s to 0.5 mm/s). The gas concentration and ultrasound power were fixed at 3.26% and 10 W, respectively. FIGS. 9A and 9B show the resulting open celled porous structures. It is clear that the pore sizes of these two foamed regions are substantially different. With the faster scanning speed, 2.4 in/min (1 mm/s), the average pore diameter obtained was 88 μm, as shown in FIG. 9A. With the slower speed, 1.2 in/min (0.5 mm/s), the bubbles grew much bigger and the average diameter reached 182 μm, as shown in FIG. 9B. This result is consistent with that observed in the previous section, i.e., the pore size increases as the ultrasound scanning speed decreases. In both cases there are many openings on the bubble walls, which suggest that the porous structures are interconnected. The interconnectivity of these foamed regions was also confirmed by the dye penetration test.

Gas Concentration Profile in Partially Saturated Samples

Partially saturated samples have non-uniform gas concentration profiles in the polymer matrix depending on the saturation pressure, saturation time, and desorption time. Although the overall gas concentration can be obtained by measuring the weight increase of the saturated sample, the gas concentration profile is hard to obtain without a predictive gas concentration model. In this study, a gas diffusion model was developed to understand the gas concentration condition for obtaining open-celled porous structures.

Figure 10:
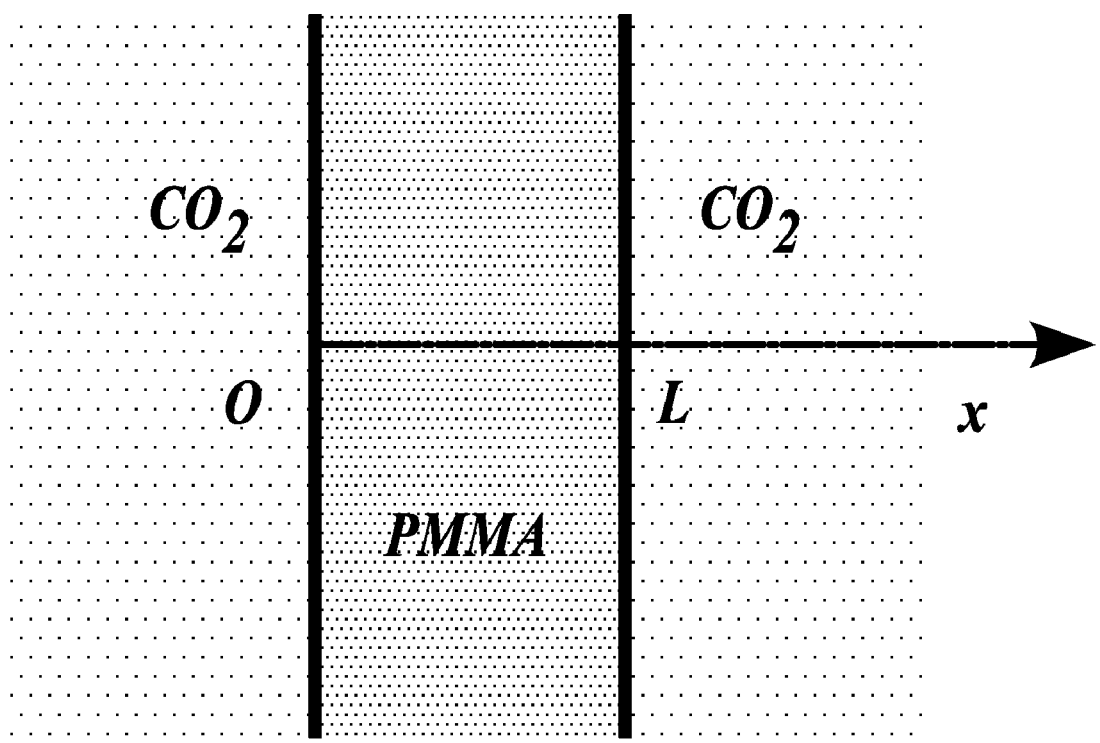
FIG. 10 is a schematic illustration of a gas diffusion model for a polymeric chip.

FIG. 10 shows a schematic of the diffusion model. It is assumed that (1) the PMMA sample is an infinite large sheet with thickness L, (2) the diffusion coefficient of PMMA-$CO_2$ system, D, is a function of gas concentration, (3) the initial gas concentration in the polymer sample is $C_i$, and (4) the sample is suddenly immersed in high pressure $CO_2$ and the gas concentration at the boundaries reaches the equilibrium concentration $C_b$ immediately. Based on these assumptions, the diffusion process in the PMMA-$CO_2$ system can be modeled using a one dimensional diffusion equation, $$\frac{\partial C}{\partial t} = \frac{\partial}{\partial x}\left[D(C)\frac{\partial C}{\partial x}\right] \quad (2)$$

where C [wt %] is the local gas concentration and D(C) [cm²/s] is the concentration dependent diffusion coefficient. The diffusion coefficient is modeled as a function of the concentration because it has been seen in FIG. 4 that the diffusion process of PMMA-$CO_2$ system is concentration dependent. For the PMMA-$CO_2$ system, a functional form for the diffusion coefficient D(C) can be adopted as, $$D(C) = D_0 \exp\left(\frac{\beta C}{1 + \eta C}\right) \quad (3)$$

where $D_0$ is the diffusion coefficient when C=0, and β and η are constants that can be determined from the sorption kinetic curves shown in FIG. 4. In this study, $D_0$ is chosen as 10×10⁻¹⁰ cm²/s, and β and η are estimated to be η=−0.0476 and β=0.0728 based on a known procedure. Since Equation (2) is a nonlinear partial differential equation, the finite difference method was used to solve for the gas concentration profiles inside the partially saturated samples.

Figure 11A:
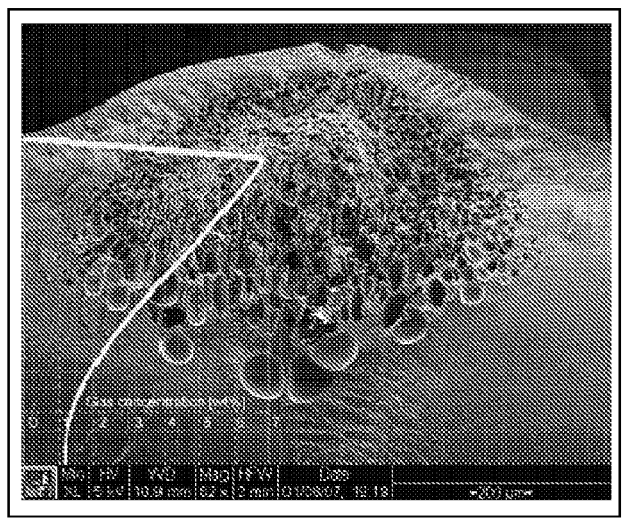
FIGS. 11A-11B are scanning electron micrographs of foams having varying pore size diameters as a result of varying concentration of gas throughout the thickness of the polymeric chip.
Figure 11B:
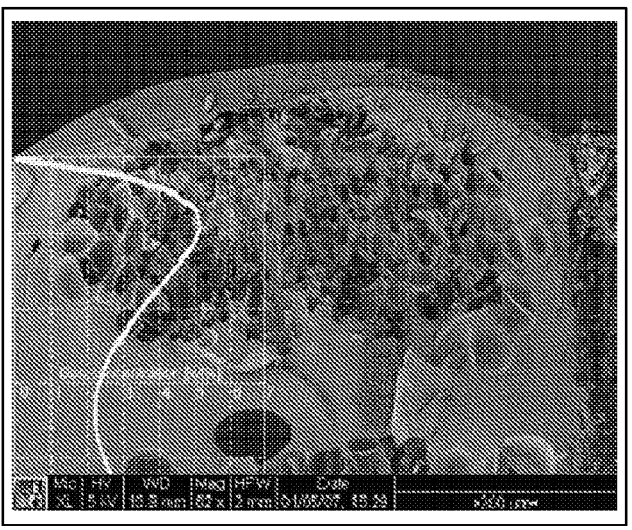

FIG. 11 shows the SEM images of two foamed samples that were both partially saturated at 2 MPa until the overall gas concentration reached 4.0%. The samples were allowed to desorb gas at atmospheric pressure for 0.5 and 6 hours, respectively, and then foamed using 10 W ultrasound power and 2.4 in/min (1 mm/s) scanning speed. The predicted gas concentration profiles were overlaid on top of the SEM images of the porous structures. In the case of 0.5 hour desorption time (FIG. 11A), the local gas concentration under the surface of the sample was close to the equilibrium gas concentration, which is 7.1%, while it was about only 1% in the center of the sample. Interconnected pores were observed in the area corresponding to local gas concentration around 3-5%. After 6 hours of desorption, the gas concentration profile became equalized and thus the curve became smoother, as can be seen in FIG. 11B. A larger area of the sample had a local gas concentration between 3-5%. As a result, more interconnected pores were observed in this specimen. In the areas where the local gas concentration was lower than 3%, no foaming was observed. The interconnectivities of these two samples were again verified using the dye penetration test. The foaming results from the above two samples indicate that 3-5% is the preferred gas concentration range to create interconnected open-celled porous structures. Partial saturation with desorption is an efficient way to achieve this low gas concentration range in a shortened overall time.

Creation of Hierarchical Porous and Columnar Structures

Figure 12:
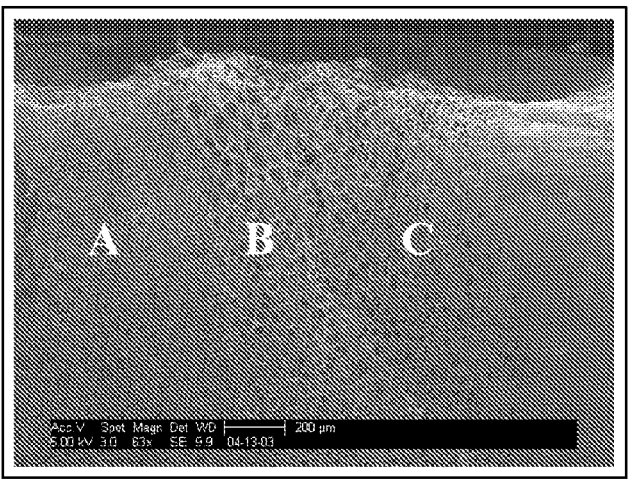
FIG. 12 is a scanning electron micrograph of a foam having a hierarchical pore structure.

HIFU insonation of saturated polymer samples has the ability to create hierarchical porous structures. FIG. 12 shows a SEM image of the cross-section of a HIFU foamed PMMA sample saturated with $CO_2$. The ultrasound insonation was applied at the top at 6 Watts input power for 8 seconds. As can be seen, there are basically three distinct regions, starting from the center of the focal zone to the right in the radial direction: Region A with a pore size diameter of about 10 μm, Region B with pore size diameter of about 5 μm and bigger, and Region C, which is a transitional region.

According to temperature measurement result, it was found that along the radial direction the temperature decreases exponentially with the radial distance. This means that the temperature along the radial direction will drop very fast. Meanwhile, during HIFU insonation, the heat generated by ultrasound will diffuse along the radial direction simultaneously as the energy being deposited. In Region A, which is inside the focal zone, the energy input during HIFU insonation happens extremely fast, and the gas molecules dispersed in the polymer matrix will nucleate and the bubble will expand instantaneously. As a result, a huge amount of bubbles are formed and their expansion is halted when they begin to impinge on one another. From the SEM image, the diameter of this region (taking into account the symmetrical region on the left hand side as well) is around 1 mm, which is basically equal to the axial FWHM of the sound beam.

The pore size in Region B is much bigger in comparison to that in Region A. The reason is that the temperature increase in this region mainly depends on the energy propagation from the focal zone, for which a relative longer heating time is needed. The gas molecules, therefore, will have much more opportunities to escape from the polymer matrix before nucleating. This results in a decreased gas concentration level in Region B, fewer nuclei, and therefore larger bubble size.

Hierarchical structure may also be created by moving the focal zone of the HIFU transducer relative to the polymer sample, while changing the scanning speed or ultrasound power. As the parameters are changed, the resulted diameters of the pores will be different at any given locations of the polymer chip.

Figure 13:
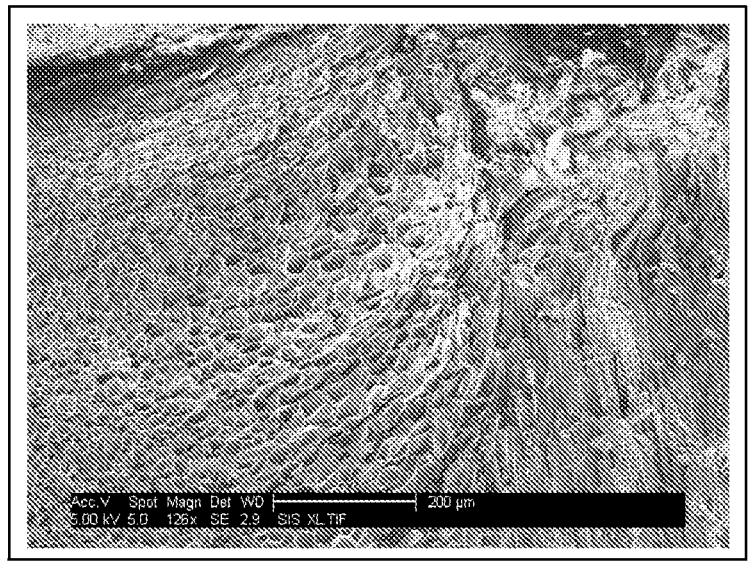
FIG. 13 is a scanning electron micrograph of a foam having a columnar pore structure.

Other special morphologic regions are also generated during the HIFU foaming process. For example, FIG. 13 shows the formation of a columnar zone in PMMA samples. Part of the reason of this phenomenon is because of the extremely high temperature gradient in the focal zone, causing the expansion of a gas cluster to have directional preference along the axial direction of the sound beam. The temperature gradient in the axial direction of the sound beam is smaller than that on the radial direction. This allows the softened polymer to flow along the axial direction and thus create the columnar porous structure.

Although the energy transport process in a foamed polymer sample is very complicated, the HIFU foaming results have shown that the temperature differences inside the polymer samples can be used to produce hierarchical porous structures. By choosing appropriate ultrasound parameters, HIFU is able to create designed microstructures in polymers. This process capability is useful for fabricating hierarchically-structured porous polymers for tissue engineering applications.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for making a microcellular porous foam, comprising:
   impregnating a thermoplastic polymer with a gas to produce a gas-impregnated polymer;
   generating ultrasonic waves with an ultrasound transducer;
   focusing the ultrasonic waves into a focal zone;
   passing a selected region of the gas-impregnated polymer within the focal zone, wherein the ultrasound transducer is not in contact with the gas-impregnated polymer; and
   inducing gas within the polymer to nucleate and form bubbles in the region exposed to the focal zone to form a porous foam, wherein a size of the formed porous foam is commensurate with a size of the focal zone.

2. The method of claim 1, wherein the foam comprises pores having an average diameter of 10 µm to 200 µm.

3. The method of claim 1, wherein the foam comprises pores having an average diameter of 80 µm to 200 µm.

4. The method of claim 1, wherein the gas is carbon dioxide or nitrogen or a combination thereof.

5. The method of claim 1, further comprising impregnating the polymer with the gas at a pressure from 2 MPa to 10 MPa at room temperature.

6. The method of claim 1, wherein the polymer is biocompatible or biodegradable.

7. The method of claim 1, wherein the polymer is poly(lactic acid), poly(lactic-co-glycolic acid), poly(methyl methacrylate), or polystyrene.

8. The method of claim 1, wherein the polymer is fully saturated with gas.

9. The method of claim 1, wherein the polymer is partially saturated with gas.

10. The method of claim 1, wherein the polymer has a gas concentration of about 3% to 5% by weight.

11. The method of claim 1, comprising allowing the polymer to desorb gas after impregnating with the gas.

12. The method of claim 1, comprising fully saturating the polymer with a gas, followed by desorption of gas to achieve a partially saturated polymer.

13. The method of claim 1, further comprising controlling power and ultrasound scanning speed during applying ultrasonic energy to affect the pore diameter size of the foam.

14. The method of claim 1, wherein the polymer is partially saturated with the gas and the gas concentration is variable throughout the polymer.

15. The method of claim 1, further comprising selecting a region of the polymer to insonate with ultrasonic energy to create a localized foam in the polymer.

16. The method of claim 15, wherein the porous region of foam in the polymer has a side dimension not exceeding about 1 mm.

17. The method of claim 15, comprising focusing the ultrasonic energy onto a localized area of the polymer.

18. The method of claim 1, wherein the porous foam comprises interconnected open-celled pores.

19. The method of claim 1, wherein the porous foam comprises close-celled pores.

20. The method of claim 1, further comprising moving the focal zone relative to the gas-impregnated polymer in at least one direction to create a linear porous foam.

21. The method of claim 1, further comprising locating an ultrasound transducer and the gas-impregnated polymer in water to allow ultrasound wave propagation.

22. The method of claim 1, further comprising creating more than one porous foam in the same polymer, each porous foam being separate.

23. The method of claim 1, further comprising controlling the distance of the polymer with respect to a focal plane.

24. The method of claim 1, further comprising heating a localized area of the polymer.

25. The method of claim 1, further comprising moving the focal zone relative to the gas-impregnated polymer in three directions.

26. A method for making a microcellular porous structure, comprising:
   impregnating a thermoplastic polymer with a gas to produce a gas-impregnated polymer;
   generating ultrasonic waves;
   focusing the ultrasonic waves into a focal zone;
   passing a region of the gas-impregnated polymer within the focal zone and heating a localized area of the polymer; and
   inducing gas within the polymer to nucleate and form bubbles in the region exposed to the focal zone to form a localized porous structure in the polymer.

* * * * *